(12) United States Patent
Hofstetter et al.

(10) Patent No.: US 6,190,157 B1
(45) Date of Patent: Feb. 20, 2001

(54) EJECTION DEVICE

(75) Inventors: Otto Hofstetter; Luis Fernandez, both of Uznach (CH)

(73) Assignee: Otto Hofstetter AG, Werkzeug-und Formenbau, Uznach (CH)

( * ) Notice: Under 35 U.S.C. 154(b), the term of this patent shall be extended for 0 days.

(21) Appl. No.: 09/180,818

(22) PCT Filed: Jun. 10, 1997

(86) PCT No.: PCT/CH97/00231

§ 371 Date: Nov. 12, 1998

§ 102(e) Date: Nov. 12, 1998

(87) PCT Pub. No.: WO97/47459

PCT Pub. Date: Dec. 18, 1997

(30) Foreign Application Priority Data

Jun. 11, 1996 (CH) .................................................. 1455/96

(51) Int. Cl.[7] .................................................. B29C 49/64
(52) U.S. Cl. ........................ 425/526; 425/534; 425/547
(58) Field of Search ................................... 425/526, 534, 425/547, 444

(56) References Cited

U.S. PATENT DOCUMENTS

| | | | | |
|---|---|---|---|---|
| 4,102,626 | * | 7/1978 | Scharrenbroich | 425/526 |
| 4,729,732 | * | 3/1988 | Schad et al. | 425/534 |
| 5,447,426 | * | 9/1995 | Gessner et al. | 425/526 |
| 5,702,734 | * | 12/1997 | Hartman et al. | 425/526 |
| 5,707,662 | * | 1/1998 | Bright et al. | 425/547 |
| 5,837,299 | * | 11/1998 | Bright et al. | 425/526 |
| 5,855,932 | * | 1/1999 | Bright et al. | 425/534 |

FOREIGN PATENT DOCUMENTS 42 12 115 * 6/1993 (DE) ..................................... 425/526

* cited by examiner

*Primary Examiner*—Robert Davis
(74) *Attorney, Agent, or Firm*—Nath & Associates; Gary M. Nath; Harold L. Novick

(57) ABSTRACT

The invention concerns an ejector for a discharging device for the removal of preforms which enables a partially cooled preform to be detached safely from a form tool and, on complete cooling, to be likewise removed from the discharging device safely and completely.

11 Claims, 5 Drawing Sheets

EJECTION DEVICE

Figure 1:
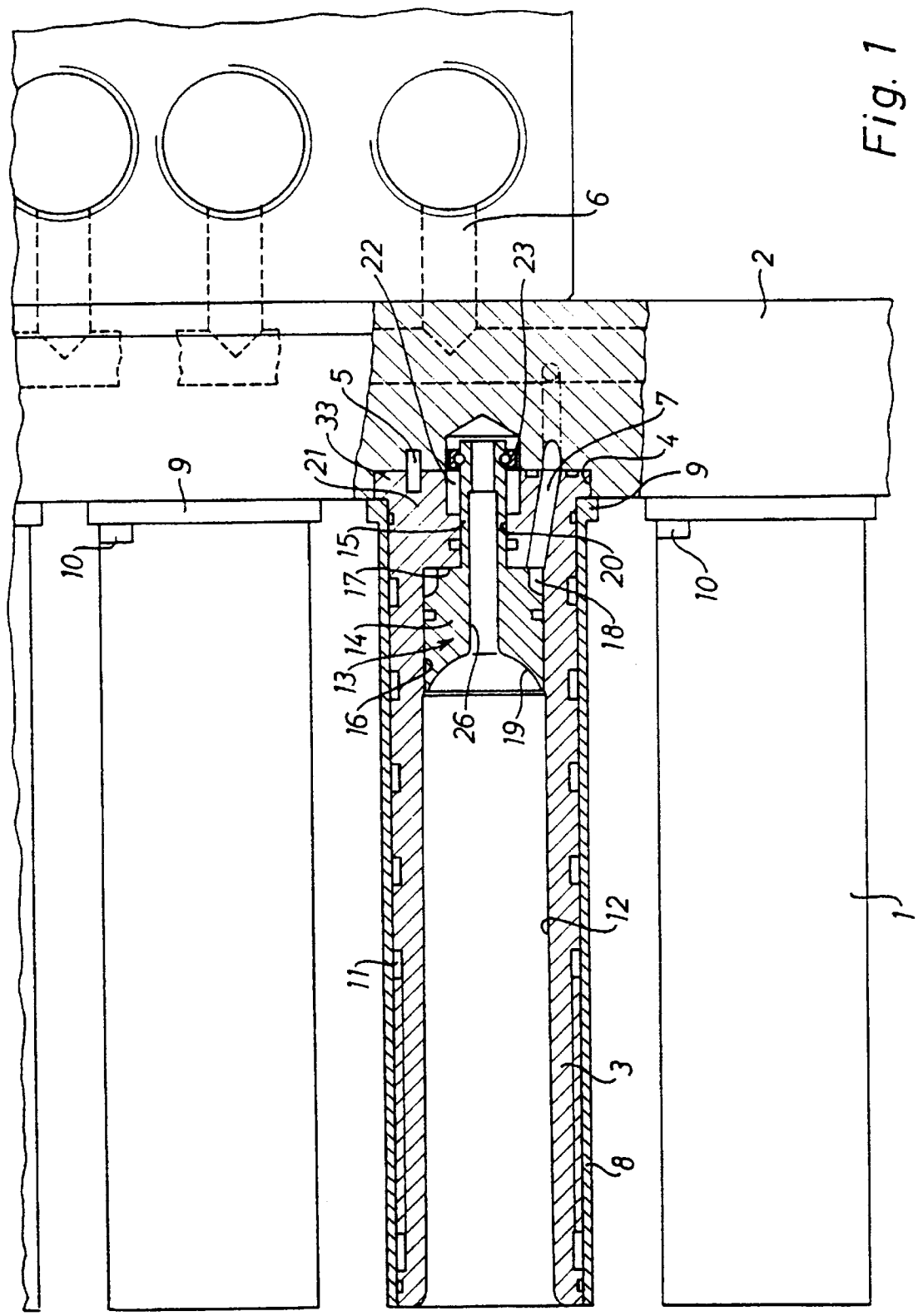

The present invention relates to an ejection device for a discharging tool suitable for the removal of preforms, from a mould tool.

Machines for manufacturing preforms or preform blanks, in particular for the manufacture of drinks bottles of PET, comprise essentially a plastic unit and a mould tool unit. With this discharging tool for the removal of the preforms from the mould tool are increasingly applied in order to reduce the cycle times and in particular the long moulding time of the plastic injection moulding machines caused on account of the long cooling times of the preforms. For this the mould tools after the injection procedure or during the cooling phase are prematurely opened and the preform blanks which are not completely cooled down are automatically accommodated by these discharging devices and cooled further. During this cooling time the mould tools may again be closed and filled again. Modern discharging devices may as a rule accommodate three charges manufactured after one another before they eject the first charge.

For the ejection of the cooled preforms, in this field various devices are known. One of the most commonly used ejection devices comprises in the inside of the coolable removal sleeves a piston which may be ejected outwards with pressurised air. A bolt fixed in the floor of the removal sleeve retains this piston in its end position, whilst the pressurised air, through a bore in the cylinder, may expel the preform blank from the sleeve. This bore through the piston is simultaneously used in order to pump away the air in the removal sleeves via the pressurised air conduit system provided for the ejection, i.e. in order to produce in the removal sleeves a vacuum or suction effect with which the preforms may be pulled into the removal sleeves. Unfortunately it has been shown that the preforms which shrink or contract on cooling do not release uniformly from the walling of the removal sleeves and partly unexpectedly remain firmly adhesed thereto. With known ejection devices this leads to the fact that the cooled preforms cannot be ejected with certainty since the pressurised air provided for ejection escapes at the removal sleeves with easily removable preforms or with already ejected preforms.

It is therefore the object of the present invention to provide a discharging tool with an ejection device, with which the cooled preforms may be securely removed from the mould tool and after their cooling likewise may be securely and completely ejected again from the discharging tool.

According to the invention this is achieved with an ejection device, and in particular with an ejection device which comprises an ejection piston whose piston head is displaceable in the preform holder in a pressure-tight manner. Between the piston head and the floor part of the preform holder there is formed a pressure chamber which communicates with a pressurised air channel system provided in the base plate of the discharging tool. Additionally the ejection piston comprises a piston pin which is guided through a bore in the floor part of the preform holder and in turn is mounted in this bore in a pressure-tight and movable manner. This piston pin projects in a second chamber (subsequently also called vacuum chamber), which communicates with a vacuum channel system provided in the base plate of the discharging tool. This second chamber communicates via a bore leading through the piston pin and the piston head into the inner space of the preform holder. For receiving preforms the removal plate is positioned in the desired manner in the opened mould tool. By way of the suction effect produced with the vacuum system, the individual preforms are pulled into the respective preform holder until this bears on the piston end face of the piston head. By way of the further vacuumisation of the second chamber, the whole ejection piston together with the preform is pulled further against the floor of the preform holder and is held here. With this the vacuum may be controlled in a suitable manner. After the cooling has been effected the pressurised air system is activated and in the pressure chamber between the piston head and the floor part a pressure is built up with which the displaceable piston head is moved outwardly in order to eject the cooled preform out of the preform holder. A flange at the end of the piston pin determines the end position of the ejection piston.

This device ensures that the excess pressure produced in the pressure chamber on ejection of the preforms does not fall, independently of the acting adhesing forces, and is controllable in a simple manner. The individual preforms are safely ejected with this device. For the first time this device permits the pulling in and ejection forces to be controlled and regulated in a suitable manner. Furthermore with the ejection device according to the invention the preform may also be actively cooled in the moulding region.

In further embodiment forms it is taken care of that the piston end face tightly conforms to the outer shape of the preform. Helpfully this surface may be coated with a particularly suitable anti-sticking layer. It has proven to be particularly advantageous when the pressure chamber moving the piston is formed annularly and the piston pin at its end on the side of the base plate comprises a flange for limiting the piston stroke. For permitting a simple assemby and disassembly of the individual preform holders these comprise in each case an outer tubular cylinder housing and an inner cup-like cylinder liner, wherein this cylinder liner on the floor side is provided with a base part which may be inserted into a recess or the base plate. This base part is secured against turning on the base plate by way of positioning pins. The cylinder sleeve of the preform holder comprises a foot plate in a manner such that the base part of the cylinder liner with the help of this foot plate may be held firmly in the recess of the base plate.

Figure 2:
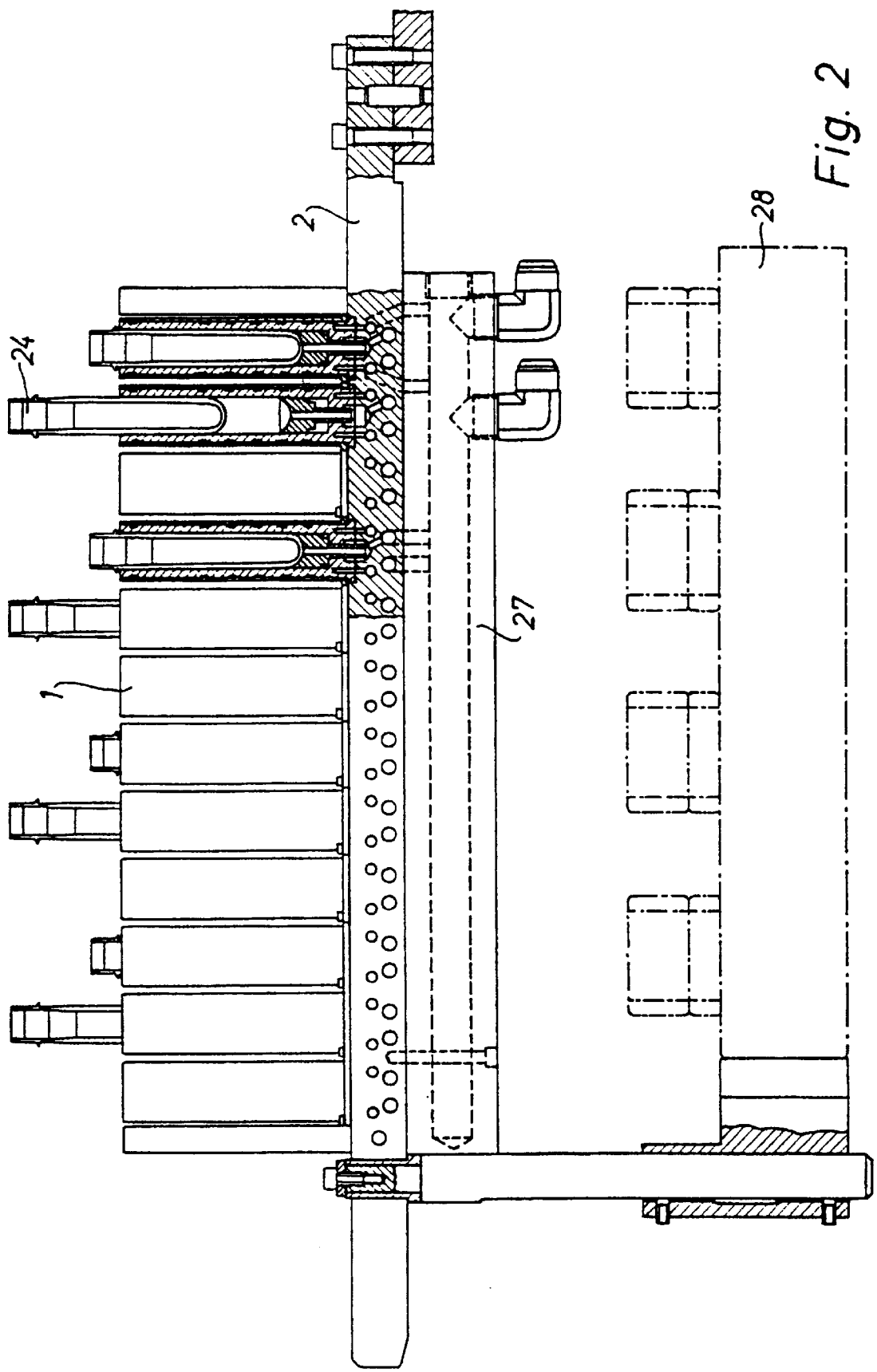
Figure 3:
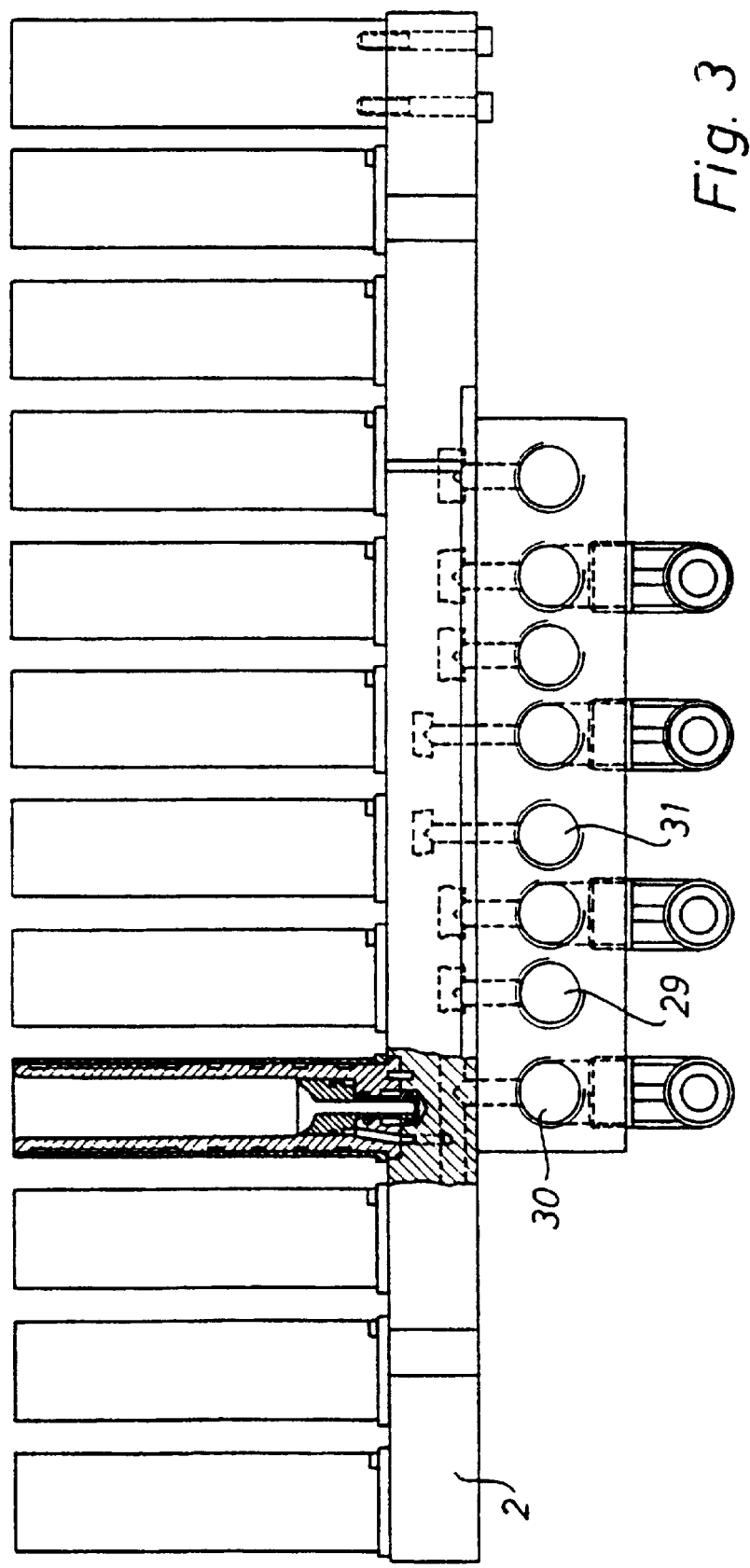
Figure 4:
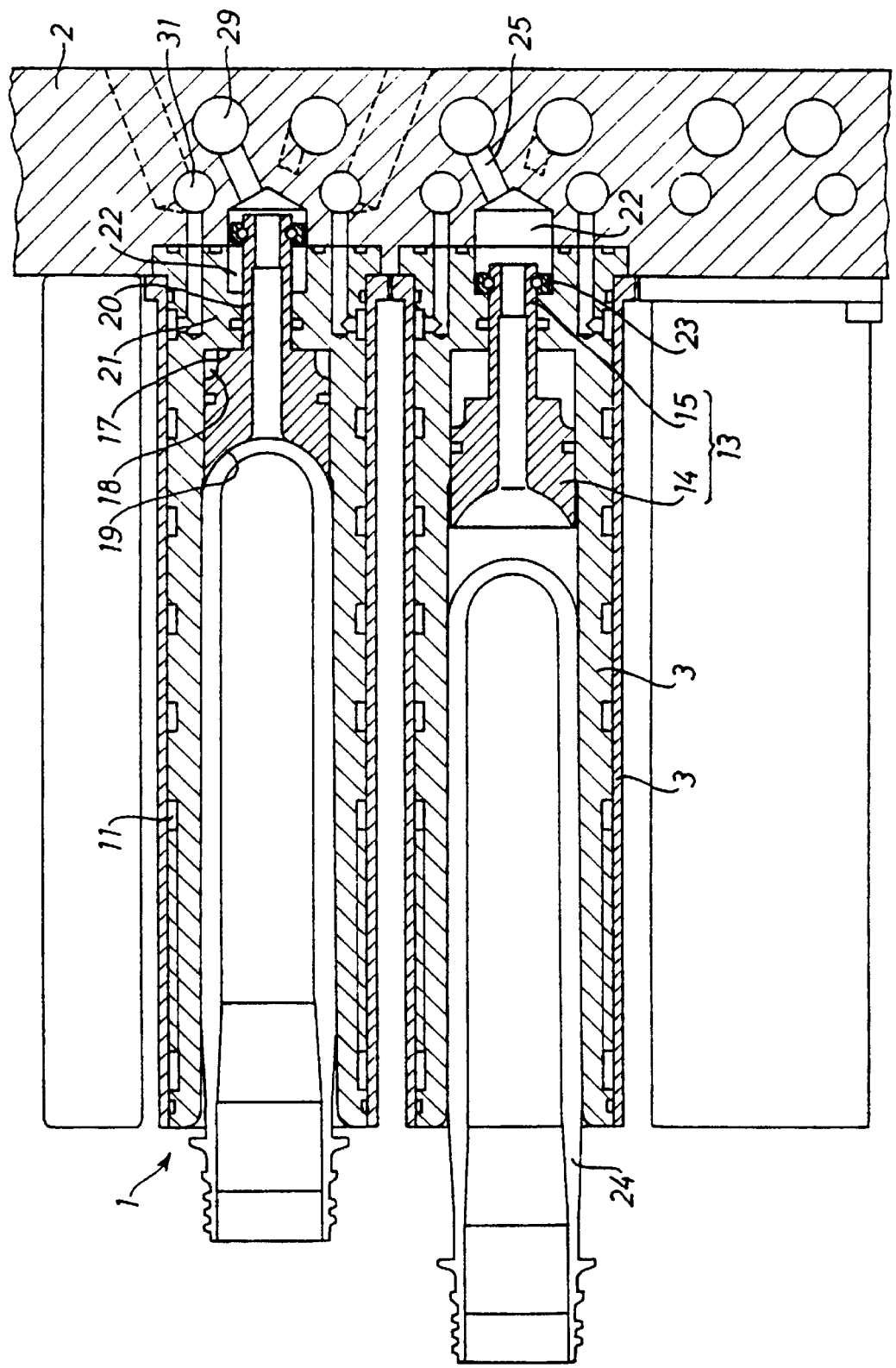
Figure 5:
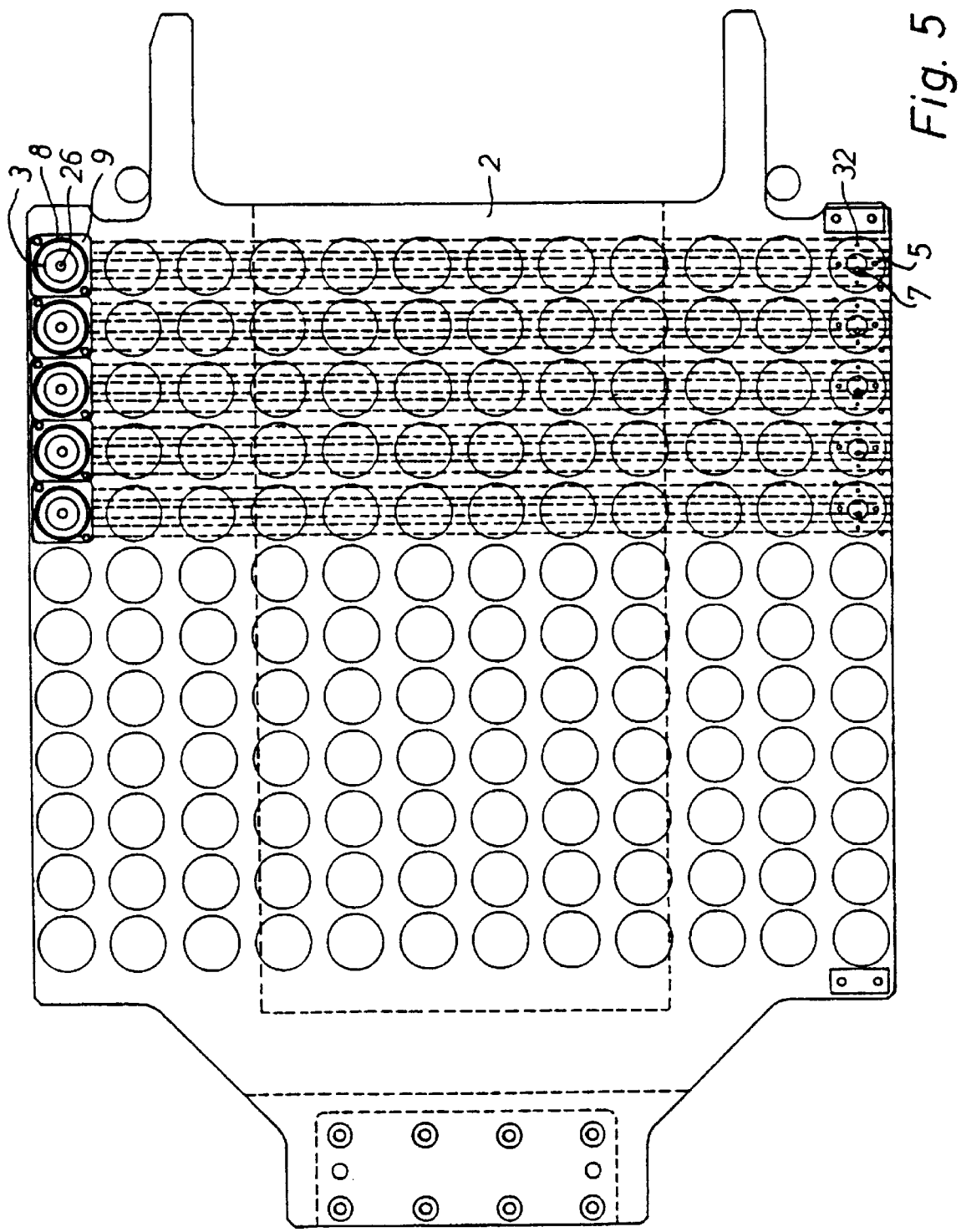

In the following the present invention is described in more detail by way of one embodiment example and with the help of the figures. With this there are shown:

FIG. 1 a longitudinal section through the preform holder according to the invention in the plane of the pressurised air system;

FIG. 2 a cross section through the discharging tool according to the invention;

FIG. 3 a cross section through the supply plate of the discharging tool according to the invention;

FIG. 4 a longitudinal section through the preform holder in the plane of the cooling system;

FIG. 5 a view on the removal plate which is only partly charged.

The construction of the preform holder and ejection device formed according to the invention can be seen from FIG. 1. A multitude of preform holders 1 are mounted on a base plate 2. With this a cup-like cylinder sleeve 3 with its base part is admitted into a suitable recess 4 and is so positioned with the help of a positioning pin 5 that the supply conduits 6 of the pressurised air supply system are in connection with a pressurised air channel 7 provided in the cylinder liner 3. Around the cup-like cylinder liner 3 there lies a tubular cylinder sleeve 8 which comprises a foot plate 9 which with the help of screws 10 is fastened to the base plate 2. By way of this the base part 33 of the cylinder liner 3 is firmly held in the recesses 4 of the base plate 2. Between the cylinder liner 3 and the cylinder sleeve 8 there are provided recesses 11 in which a coolant may circulate. It is to be understood that the shape of the inner walling 12 of the cylinder sleeve 3 corresponds to the shaping of the outer surface of the preform to be manufactured and may be coated for an easier removal, and runs conically. The ejection device comprises an ejection piston 13 which is formed from a piston head 14 and a piston pin 15. The piston head 14 runs in a cylindrical floor space 16 of the cup-like cylinder liner 3 in a pressure-tight manner. Between this piston head 14 and the floor surface 17 of the floor space 16 there is formed a pressure chamber 18 which communicates with the pressurised air channel 7. It is to be understood that the piston end surface 19 follows the form of the preform to be manufactured. The piston pin 15 provided on the piston head 14 likewise runs in a piston pin opening 20 of the floor part 21 of the cup-like cylinder sleeve 3 in a pressure tight manner and projects into a vacuum chamber 22 which is connected to a vacuumisation system (not shown). A central bore in the ejection piston 13 creates the connection between the vacuumisation system and the inner space of the preform holder and by way of this permits the pulling in of the preform with the help of the vacuumisation system.

For the ejection device, the pressure chamber 18 via the pressurised air channel 7 is set under pressure and by way of this the ejection piston 13 is moved in the direction to the opening of the preform holder. The pressure tight guiding of the piston head 14 and the piston pin 15 prevents pressurised air from escaping with this ejection movement. A flange 23 in the form of an attached ring, which is fastened in the vacuum chamber 22 on the piston pin 15, defines the maximum stroke of the ejection piston 13.

The discharging tool shown in cross section in FIG. 2 is pushed between the matrix plate 28 and the male mould plate (not shown) of the opened mould tool and essentially comprises a base plate 2 with a multitude of preform holders 1 fastened thereon and a supply plate 27 for supplying the vacuum and excess pressure systems and the cooling system. This figure clearly illustrates that with the discharging tool three charges may be cooled off one after the other in that in each case only every third preform holder 1 reciprocates with the vacuumisation system for accommodating a preform or only every third preform holder 1 reciprocates with the excess pressure system for the ejection procedure. A preferred embodiment of the discharging tool comprises twelve rows arranged behind one another as are represented in FIG. 2, and is thus suitable for the simultaneous removal of 48 preforms.

FIG. 3 shows the geometric arrangement of the pressurised air conduits and their connection to the respective pressure chambers 18 of the preform holder 1. The supply plate 27 for this guides three channel systems independent of one another, for the vacuumisation 29, for the excess pressure 30 and for the cooling 31. This figure clearly shows that in each case three preform holders independently of one another must be in connection with the corresponding supply conduits in order to permit their control independently of one another.

FIG. 4 shows two preform holders 1 arranged next to one another whose ejection devices are in various operating positions. The section shown runs transversely to the cross section shown in FIG. 1 and in contrast to this shows the connection of the coolant channel 31 to the recesses 11 provided for cooling the cylinder liner 3, as well as a connection 25 between the vacuumisation channel 29 and the vacuum chamber 22. With a sucked in preform the piston head 14 of the ejection piston 13 lies on the floor surface 17 of the floor part 21 of the cup-like cylinder liner 3. The accompanying piston pin 15 at the same time projects completely through the piston pin opening 20 into the vacuum chamber 22. The pressure chamber 18 is formed as an annular chamber and is connected to the pressurised air system (not shown). The piston end face 19 conforms to the outer shape of the preform 24. By way of the large surfaced guiding of the ejection piston 13 this transfers the heat taken up by the preform 24 directly to the cooled cylinder liner 3 and thus actively supports the cooling of the hot preform 24 in the moulding region. During the cooling phase the vacuum produced in the vacuum chamber 22 is maintained.

After completion of the required cooling time the vacuum in the vacuum chamber 22 is reduced and the pressure chamber 18 is set under pressure. With this the ejection piston 13 is pushed against the opening of the preform holder 1. The end position of the ejection piston 13 is preferably fixed by a flange 23. After the expulsion of the preform 24 the preform holder 1 is ready for receiving the next preform 24 and the vacuumisation system merely requires to be activated again.

FIG. 5 shows a view of a removal plate which is only partly equipped with preform holders 1. The arrangement and fastening of the foot plates 9 connected to the cylinder sleeves 8 can be seen from this. The bore 26 which is in connection with the inner space of the cylinder liner 3 and the vacuum chamber 22 is centrally arranged in this embodiment example. The pressurised air channel 7 ends in the periphery of the floor surface 17 and thus is in connection with the annular vacuum chamber 18 formed by the piston head. The bores 32 for the supply and removal of the coolant are centrally opposite one another. Perpendicular thereto there are provided the recesses for the positioning pins 5. The embodiment form shown of the removal plate according to the invention comprises twelve rows each with 12 preform holders 1 and is thus suitable for the removal of preforms from a 48 multiple tool. Further preferred features of the ejection device according to the invention are specified in the dependent claims.

It is to be understood that this ejection device may also be used with removal plates with more than 48 preform holders. This device permits the arrangement of the preform holders in any suitable manner and is thus suitable for mould tools of every type.

What is claimed is:

1. A discharging tool comprising an ejection device for removing preforms from a mould tool,
    said discharging tool comprising:
        at least one base plate,
        a multitude of preform holders fastened to said at least one base plate, and
        a suction device for suctioning the preforms; and
    said ejection device comprising in each case:
        one ejection piston which is arranged within each preform holder and which is actuatable with the help of a pressurised air device, characterised in that the ejection piston comprises a piston head which in a floor region of the preform holder is displaceable in a pressure tight manner,
    wherein, for ejecting the ejection piston, between the piston head and a floor part of the preform holder there is arranged a pressure chamber which communicates with the pressurised air device via a pressurised air channel, and
    said piston head on the base plate side comprises a piston pin which is guided through the floor part in a pressure tight manner and which projects into a vacuum chamber which on one side communicates with a vacuumisation channel of the suction device and on another side is in connection with an inner space of the preform holder via an opening leading through the ejection piston.

2. Discharging tool according to claim 1, characterised in that the piston head on the preform side comprises a piston end face which in a large surfaced manner conforms to the contour of the preform to be manufactured.

3. Discharging tool according to claim 1, characterised in that the pressure chamber is formed annularly and is formed by a recess of the piston head on the floor side.

4. Discharging tool according to claim 1, characterised in that the ejection piston is manufactured of heat conducting material.

5. Discharging tool according to claim 1, characterised in that the piston pin for limiting the piston stroke comprises a flange on its end on the base plate side.

6. Discharging tool according to claim 1, characterised in that the preform holder in each case comprise an outer tubular cylinder housing and an inner cup-like cylinder liner, wherein the cylinder liners on the floor side comprise a base part which in each case is inserted into a recess on the base plate.

7. Discharging tool according to claim 6, characterised in that the base part is positioned in a rotationally secure manner on the base plate by way of positioning pins.

8. Discharging tool according to claim 6, characterised in that a cylinder sleeve comprises a foot plate.

9. Discharging tool according to claim 8, characterised in that the base part of the cylinder liner is firmly held in the recess of the base plate with the help of the foot plate.

10. Discharging tool according to claim 1, characterised in that the vacuum chamber is formed by recesses, flush with one another, in the base plate and in the floor part of the cylinder liner.

11. An election device for use in a discharging tool comprising:

an election piston arranged within a preform holder actuatable with the help of a pressurised air device, wherein said election piston comprises a piston head which in a floor region of the preform holder is displaceable in a pressure tight manner;

a pressure chamber, disposed between the piston head and a floor part of the preform holder, which communicates with said pressurised air device via a pressurised air channel; and wherein said piston head, on a base plate side, comprises a piston pin which is guided through said floor part in a pressure tight manner and which projects into a vacuum chamber which on one side communicates with a vacuumisation channel of a suction device and on another side is in connection with an inner space of said preform holder via an opening leading through said ejection piston.

\* \* \* \* \*